United States Patent

Weineland et al.

[11] Patent Number: 6,029,690
[45] Date of Patent: Feb. 29, 2000

[54] INLET PORTION OF A VALVE

[75] Inventors: Matti Weineland, Borås; Kurt Börjesson; Berndt Larsson, both of Vårgårda, all of Sweden

[73] Assignee: Gustavsberg Vårgårda Armatur Ab, Vårgårda, Sweden

[21] Appl. No.: 09/171,712

[22] PCT Filed: Apr. 14, 1997

[86] PCT No.: PCT/SE97/00620

§ 371 Date: Oct. 23, 1998

§ 102(e) Date: Oct. 23, 1998

[87] PCT Pub. No.: WO97/40303

PCT Pub. Date: Oct. 30, 1997

[30] Foreign Application Priority Data

Apr. 25, 1996 [SE] Sweden ................................. 9601572

[51] Int. Cl.[7] ................................................. F16K 47/02
[52] U.S. Cl. ...................... 137/207; 137/625.17; 137/801
[58] Field of Search .............................. 137/207, 625.17, 137/801

[56] References Cited

U.S. PATENT DOCUMENTS

| | | | |
|---|---|---|---|
| 1,490,291 | 4/1924 | Rose | 137/207 |
| 3,565,338 | 2/1971 | Wright | 137/207 X |
| 4,111,224 | 9/1978 | Sandstrom | 137/207 |
| 5,494,076 | 2/1996 | Knapp | 137/625.17 |
| 5,871,029 | 2/1999 | Peteri et al. | 137/801 |

FOREIGN PATENT DOCUMENTS

| | | |
|---|---|---|
| 28 42 799 | 4/1980 | Germany . |
| 460 553 | 10/1989 | Sweden . |
| WO95/00790 | 1/1995 | WIPO . |

OTHER PUBLICATIONS

"International Search Report" dated Aug. 6, 1997.
"International Preliminary Examination Report" dated Apr. 20, 1998.

*Primary Examiner*—Gerald A. Michalsky
*Attorney, Agent, or Firm*—Finnegan, Henderson, Farabow, Garrett & Dunner, L.L.P.

[57] ABSTRACT

An inlet portion of a valve, comprising a tube element having at least one connecting piece which forms the connection of a connecting tube which in turn is connected to a water supply net. The connecting piece is provided with a tube part being coaxially arranged to the connecting tube, which tube part extends partly into the tube channel of the connecting tube. The tube part has such dimensions that a slit space is maintained between the tube part and the channel wall of the connecting tube.

3 Claims, 3 Drawing Sheets

INLET PORTION OF A VALVE

TECHNICAL FIELD

The present invention relates to an inlet portion of a valve, comprising a tube element having at least one connection piece providing a connection to a connecting tube, which in turn is connectable to a water supply net.

BACKGROUND OF THE INVENTION

An inlet portion of a mixing valve is, e.g., known from SE-B-460 553. The connecting tubes are affixed soldering free and swivel connectable as a widened end part of the respective connecting tube are axially non-disposably mounted between the connecting piece and a site of the valve housing. The sites are placed deeply into the valve housing in a direct connection to the mixing unit arranged in the valve housing, which means that the tubes extend through an intermediate part between two partition walls in the valve housing. As a consequence of the design of the valve housing this will become relatively complicated to cast. Casting defects may arise due to the fact that the partition walls centrally placed in the valve housing will freeze prior or later than the other parts of the valve housing. If cracks should arise in the castings parts of the production have to be scrapped which increases the production costs.

Another problem of these known valves are that the mixing unit is provided with narrow passages for the water which passages creates a noise (a so called framework sound) which is distributed via the water supply system of a residential building.

THE TECHNICAL PROBLEM

One of the objects of the present invention is thus to obtain a valve which is more simple to manufacture which valve has soldering-free and swivel connectable connecting tubes. Another object is to obtain a reduction of the noise created by the mixing unit of the valve.

THE SOLUTION

In order to obtain these objects the invention is characterized in that the connecting piece of the tube element is provided with a tube part being coaxially arranged to the connecting tube, which tube part extends partly into the tube channel of the connecting tube and has such dimensions that a slit space is maintained between the tube part and the channel wall. By means of this design of the inlet connecting piece an surprisingly large suppress of the noise caused by the passages of the mixing valve.

According to a preferred embodiment of the invention the tube part comprises two cross walls being arranged mainly perpendicular to the connecting piece, which walls are connected to each other via a spacer. By means of this embodiment of the tube part the casting of the valve housing can be considerably simplified.

DESCRIPTION OF THE DRAWINGS

The invention will be more fully described in the following with reference to examples shown on the attached drawing, wherein.

DESCRIPTION OF AN EMBODYING EXAMPLE

In the following the inlet part of the invention will be described in connection with a so called one hand mixer which is connected to lines comprising both hot water and cold water. The inlet part may, of course, be applied on a simple valve having no mixing function, i.e. to provide a simple flow, as well.

Figure 1:
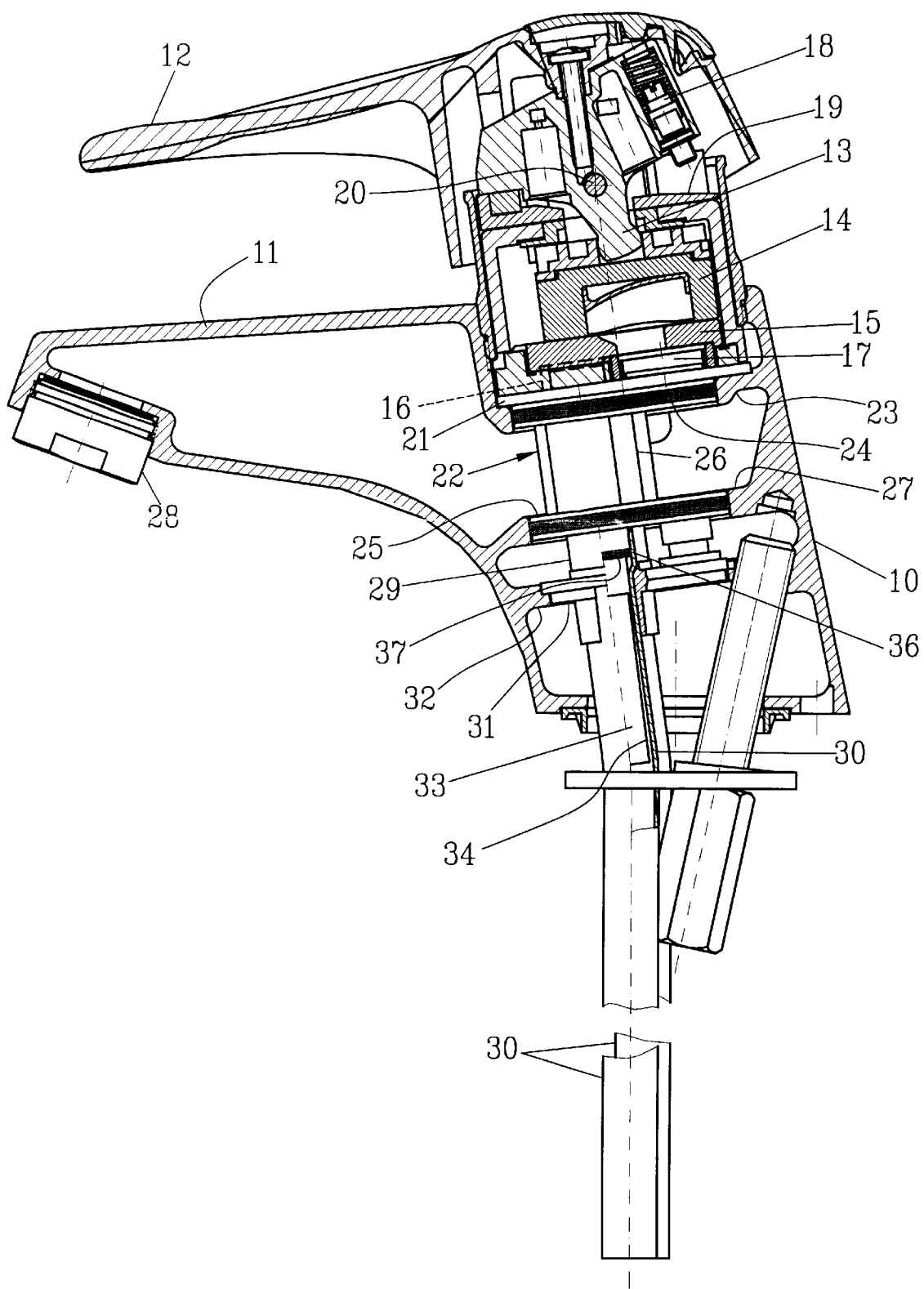
FIG. 1 shows a vertical cross-section through a mixing valve, e.g., a wash basin mixer, which is provided with an inlet part of the invention.

The one hand mixer shown in FIG. 1 has a mainly conventional design and comprises a valve housing 10 with a spout 11 and a maneuvering handle 12. The handle 12 can, according to known technology, be regarded as a two armed lever which is mounted around a vertical as well as a horizontal axis and the shorter lever 13 of which influences a movable valve plate 14 cooperating with an affixed valve plate 15, which is provided with two inlet openings 16, of which one only is seen in the figure, for cold and hot water, respectively, and an outlet opening 17, which communicates with the spout 11.

The maneuvering handle 12 is provided with a known stopping device in the form of a screw 18 fixed in a spring biassed sleeve which, at full opening of the mixing valve are disposed to abut a solid abutment surface 19 of the valve housing to obtain a resilient and adjustable limitation of the rotation of the handle 12 around a shaft 20 and thereby allows for a temporary spring biassed increase of the maximal outflow of liquid through the outlet 17. The position of the screw 18 in the sleeve is thus in a manner known per se adjustable to obtain an adjustment of the border position between normal flow and an increased maximal flow.

The valve unit 14, 15 is arranged in the valve housing by means of two screws (not shown in the figures) which extend downwardly in FIG. 1 on each side of the valve unit and are screwed into bolting holes in the valve housing. Hereby, the screws extend through a flange part 21 of the inlet part 22, which flange part 21 abuts a flange 23 of the valve housing. The valve unit 14, 15 is thus accordingly bolted against the inlet part 21 in such a way that a liquid tight connection is formed between these two components.

The flange part 21 of the inlet part 22 comprises an upper central tightening part 24 which is provided with a sealing ring of rubber and forms a cross wall which cooperates with the flange 23. Furthermore, the inlet part is provided with a lower cross wall 25 which is connected to the upper tightening part 24 via a spacer 26. The cross wall 25 is provided with a sealing ring of rubber and cooperates with a second flange 27 of the valve housing. The space between the two cross walls 24 and 25 forms a passage for water together with the opening 17 of the valve and the outlet 28 of the spout.

On the contrary side of the lower cross wall 25 two connecting pieces 29 are provided aligned with the fixed spacer 26. The connecting pieces 29 form swivel connectable connections for connecting tubes 30, which are normally delivered attached to the mixing valve and can be joint connected to a water sully net.

Figure 2:
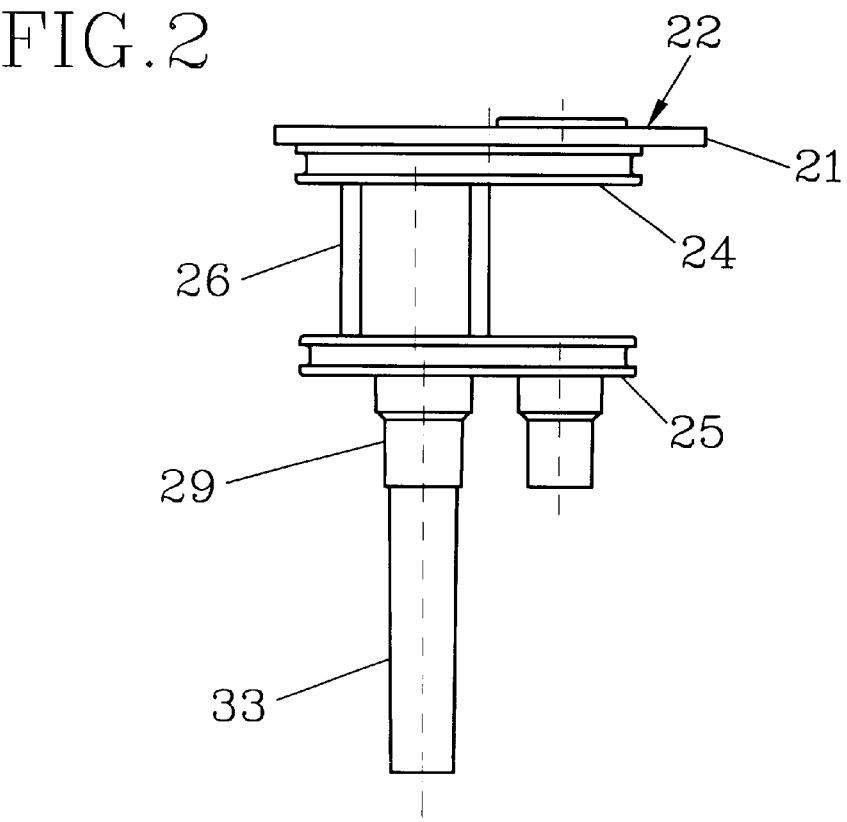
FIG. 2 shows side view of the inlet part of FIG. 1.
Figure 3:
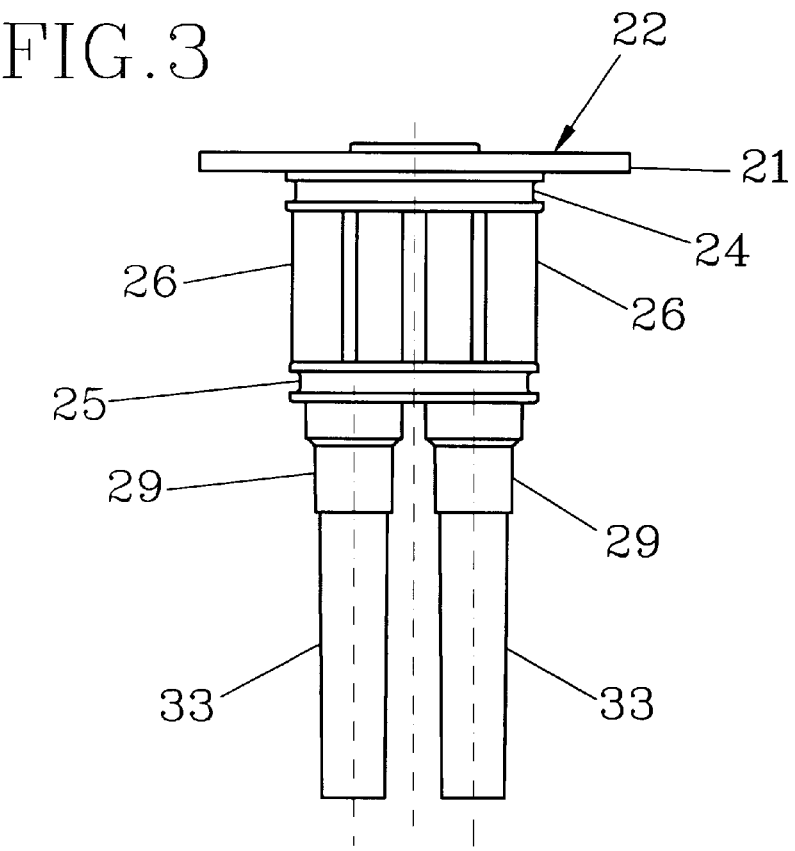
FIG. 3 shows the inlet part according to FIG. 2 but being rotated 90° its axis.
Figure 4:
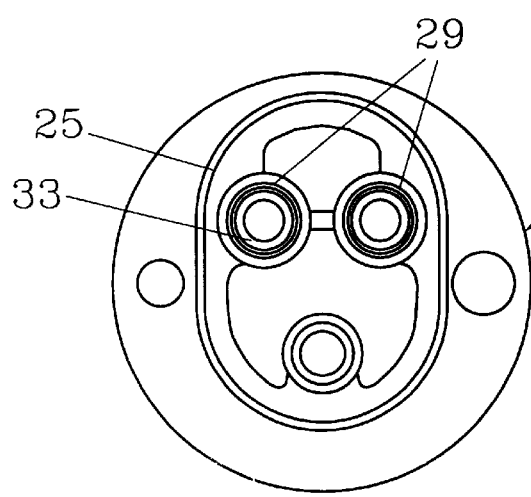
FIG. 4 shows the inlet part seen from above.
Figure 5:
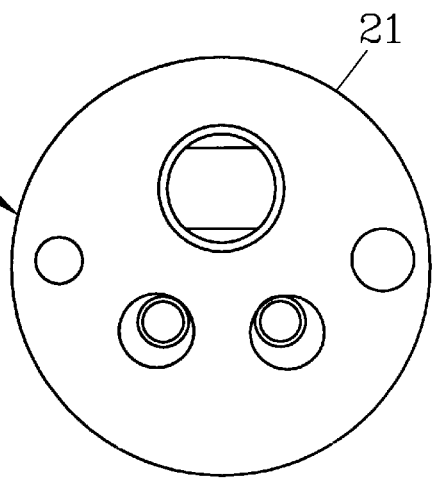
FIG. 5 shows the inlet part seen from beneath.

The connecting tubes 30 are affixed at the connecting pieces 29 of the inlet part by means of a stopping washer 31, which abuts a flange 32 of the valve housing. As evident from FIGS. 2–5 the inlet part forms an integral part, suitably made of a resinous material, mould detail. It is evident from FIGS. 2 and 3 that the connecting pieces 29 of the inlet tubes are provided with coaxially arranged tube parts 33, which extend partly into the respective connecting tube 30. The tube parts 33 have been given such dimensions that a slit space 34 communicating with the connecting tube inlet (cf FIG. 1) is maintained between the inner wall of each tube part 33.

When the mixing valve is being installed at for example a washing basin and the connecting tubes are connected to the water supply net a certain amount of air will be left in this slit space 34. This remaining amount of air forms a sound silencing isolation around the tube parts 33 so that sounds created in the passages of the valve unit will be suppressed in the tube parts before the sound waves reaches out into the sound conductors as the water supply net physically forms. Furthermore, the air forms, in the respective slit spaces 34, a resilient spring which has the ability of absorbing pressure impacts which can develop in a water supply net. Such pressure impacts may give rise to mechanical stress of the tubings which can lead to leakage.

Figure 6:
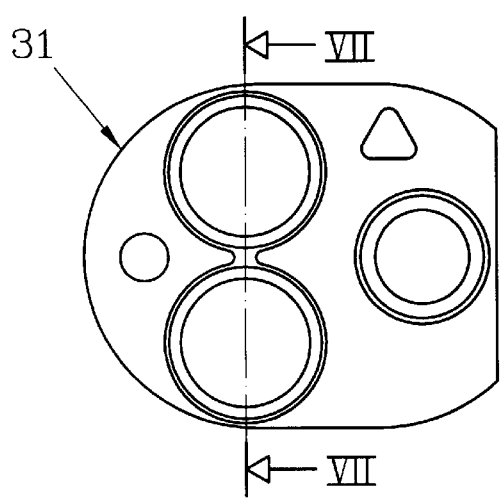
FIG. 6 shows a stopping washer cooperating with the inlet part seen in a view from above.
Figure 7:
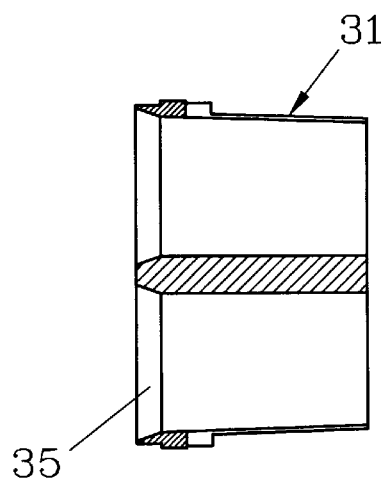
FIG. 7 is a cross-section along the line VII—VII of FIG. 6.

The stopping washer 31 is separately shown in FIGS. 6 and 7 of which is evident that the stopping washer is provided with an upwardly conical diverging site 35, which is arranged to cooperate with an enlarged part 36 having a somewhat larger diameter at the end of the respective connecting tubes 30. This enlarged/widened part 36 of the respective connecting tube is thus clamped to fix position between the conical site 35 of the stopping washer 31 and the respective connecting piece 29. This clamping lock is completed using an O-ring sealing 37 and provides a possibility to rotate the tubes, e.g., after these have been bent in one rotated position and after rotation back again are locked in a mounting position being more difficult to reach. By means of this rotatable mounting of the mounting tubes the risk is furthermore reduced to obtain mechanical stress being created in the tubes at mounting.

The invention is not restricted to the above described embodying example, but several variants are thought within the frame work of the attached claims. For example the invention can be applied on other types of valves, such as shower mixers. Furthermore, the invention is not restricted to the type of valve unit and maneuvering handle shown.

We claim:

1. A one-piece, integrally assembled inlet portion for a valve unit in a valve housing, comprising:
    a tube element having a least one connecting piece designed for connection with a downwardly directed connecting tube having an interior wall and designed to be connected to a water supply, said connecting piece having a tube part coaxially arranged with the connecting tube for extending into the connecting tube to form a slit space between the tube part and the interior wall of the connecting tube,
    two cross walls and a spacer, said cross walls positioned transverse to said connecting piece and connected to each other via the spacer, said two cross walls each provided with a peripherally mounted sealing device.

2. An inlet portion according to claim 1, mounted in said valve housing having a valve unit and a stopping washer, the stopping washer provided with a conical, upwardly diverging end, and the connecting tube having a widened part which forms a swivel connectable clamping joint together with the conical end of the stopping washer and the connecting piece.

3. An inlet portion according to claim 2 or 1 wherein the inlet portion comprises two connecting pieces and two connecting tubes, and the spacer has passages for providing communication between said valve unit and the connecting tubes.

\* \* \* \* \*